UNITED STATES PATENT OFFICE 2,012,661

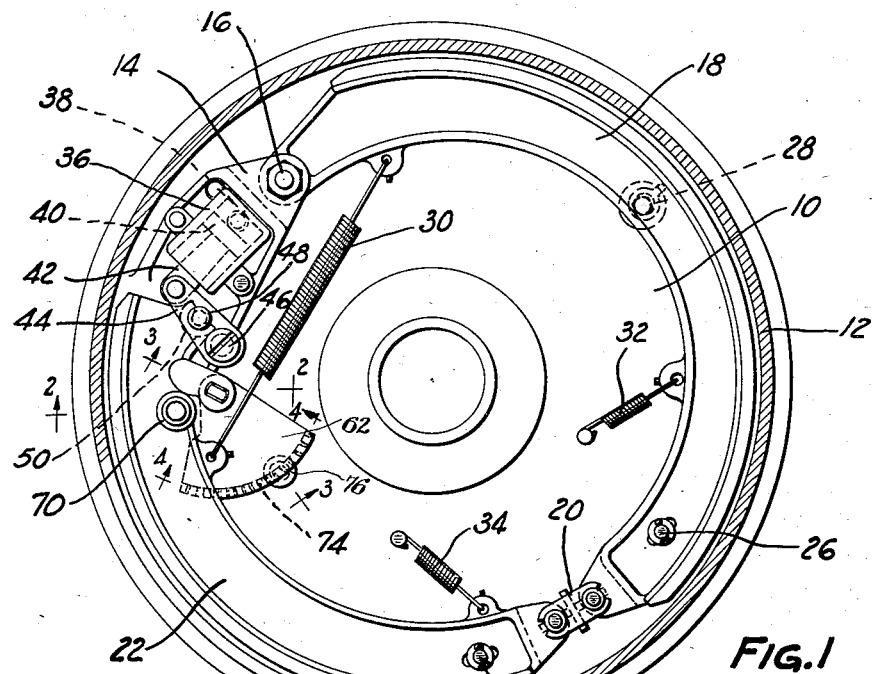

BRAKE

Frederick C. Frank, South Bend, Ind., assignor to Bendix Brake Company, South Bend, Ind., a corporation of Illinois Application August 6, 1931, Serial No. 555,488

6 Claims. (Cl. 188—106)

This invention relates to brakes and more particularly to internal expanding brakes.

Broadly, the invention comprehends a brake structure particularly adaptable for airplanes having a simple and effective means for locking the brake in applied position.

In the illustrated embodiment of the invention, an internal expanding friction element is normally operated through a hydraulic system including a cylinder, a piston movable therein and means connecting the piston to the friction element, and associated with this structure is a mechanical operating means including a cam with means for operating the cam and means for locking the cam against angular movement.

An object of the invention is to provide a brake for an airplane comprising an internal expanding friction element, hydraulic operating means therefor, and mechanical operating means for the friction element including means for locking the mechanical operating means against movement.

A feature of the invention is a friction element, an operating cam therefor and a segment secured to the cam having a ratchet and a spring pressed member engaging the ratchet.

The above objects and features of the invention include various desirable details of structure which will be apparent from the following description taken in connection with the drawing forming a part of this specification, and in which:

Figure 1 is a vertical sectional view just back of the head of the drum illustrating the friction elements in side elevation and showing the invention as applied;

Figure 2 is a sectional view substantially on line 2—2, Figure 1;

Figure 3 is a sectional view substantially on line 3—3, Figure 1; and

Figure 4 is a sectional view substantially on line 4—4, Figure 1.

Referring to the drawing for more specific details of the invention, 10 represents a fixed support such as a backing plate. The backing plate has associated therewith a rotatable drum 12 which may be secured to a wheel, not shown.

Positioned on the backing plate is a bracket 14 supporting a fixed anchor 16. A friction element or shoe 18 has one of its ends pivoted on the anchor 16 and its other end has connected thereto as by an adjusting device 20 a friction element or shoe 22, the force applying end of which is adjacent the bracket 14. The shoes 18 and 22 are supported by suitable steady rests 24 and 26 and the shoe 18 is adapted to engage when in the off position a suitable adjusting eccentric 28.

As shown, the shoes 18 and 22 are connected by a return spring 30, the shoe 18 is connected by a return spring 32 to the fixed support and the shoe 22 is connected by a return spring 34 to the fixed support. The springs 30, 32 and 34 serve to return the shoes to the off position and to retain them when in this position in proper spaced relation to the drum.

The bracket 14 supports a cylinder 36 having an intake port 38 connected to a suitable source of fluid under pressure, not shown. The cylinder 36 has positioned for movement therein a piston 40 to which is suitably connected a piston rod 42 pivotally connected to the force applying end of a lever 44 fulcrumed on the backing plate as indicated at 46. The lever 44 has positioned thereon a roller 48 engaging a notch 50 in the force applying end of the friction element 22.

The above described structure is that of a conventional hydraulically operated brake for an airplane. In structures of this type, no provision has been made for retaining the brake in applied position when the plane is not in use.

Changes in temperature of the fluid in the hydraulically operated braking systems, due to atmospheric conditions, invariably release the brakes. The present invention aims to overcome this objectionable feature and to that end provides an auxiliary operating means for applying the brake, together with means for locking the auxiliary operating means in applied and off positions.

In the illustrated embodiment of the invention, the backing plate 10 is provided with a boss 52 bored as indicated at 54 to receive a rotatable member or bolt 56 having a polygonal head 58 for the reception of an adjusting wrench. The bolt is provided with a reduced portion 60 over which is fitted a segment 62 to be hereinafter described. This bolt is further provided with flats 64 arranged to retain a cam 66 against angular displacement, the cam 66 being retained on the bolt 56 by shear-riveting the end of the bolt as indicated at 68. As shown, the cam 66 is bifurcated so that it may straddle the friction element or shoe 22 and engage rollers 70 positioned for rotation on opposite sides of the shoe.

The cam 66 is spotwelded or otherwise secured to the segment 62. The segment 62 has a flange 72 provided with teeth 74. As shown, the backing plate 10 has positioned thereon a boss 76 bored for the reception of a spring pressed plunger 78 positioned in the path of the teeth 74 on the flange 72 of the segment. The spring pressed plunger 78 is provided with a knob 80 by means of which the plunger may be retracted so that the cam 66 may be operated by rotating the bolt 56 to apply or to release the brake, and upon release of the plunger the cam will be locked against angular displacement in any position to which it may be adjusted.

It is to be understood that the forms of my invention herein shown and described are to be taken as preferred examples and that various changes in shape, size and arrangement of parts may be resorted to without departing from the spirit of the invention or the scope of the subjoined claims. It is not my intention to claim in the present application any subject-matter disclosed in my copending application No. 555,486.

Having thus described the various features of the invention, what I claim as new and desire to secure by Letters Patent is:

1. A brake comprising a brake drum, a friction element within said drum, operating means for said friction element also arranged within the drum, auxiliary operating means for the friction element also arranged within the drum, and a device separate from said auxiliary means and having a portion within the brake and a portion extending outside of the brake for locking the auxiliary operating means in adjusted position.

2. A brake comprising a brake drum, a friction element within said drum, operating means for said friction element also arranged within the drum, auxiliary operating means for the friction element including a cam also arranged within the drum, means rigid with the cam also positioned within the drum, and a device engaging with said rigid means for locking the cam in adjusted position.

3. A brake comprising a friction element, hydraulic operating means therefor, auxiliary operating means for the friction element including a cam, a segment secured to the cam and means for locking the segment against angular displacement, the hydraulic means and the auxiliary means and the segment all being arranged adjacent the same end of the friction element.

4. A brake comprising a friction element, thrust members on opposite sides of the friction element, operating means for the friction element, auxiliary operating means for the friction element including a bifurcated cam arranged to straddle the friction element and to engage the thrust members, a segment carried by the cam, a ratchet on the segment, and a spring pressed plunger engaging the ratchet.

5. A brake comprising a friction element, rollers positioned for rotation on opposite sides of the friction element, an operating member for the friction element, an auxiliary operating member for the friction element including a cam having bifurcated portions adapted to straddle the friction element and to engage the rollers, a segment secured to the cam, means for actuating the cam and means associated with the segment for locking the cam against angular movement.

6. A brake comprising a friction element, rollers on opposite sides of the friction element adjacent the force applying end of the element, operating means for the friction element, auxiliary operating means for the friction element including a cam having bifurcated portions straddling the friction element and engaging the rollers, means for actuating the cam, a segment carried by the cam having a flange normal thereto, teeth on the flange, and a spring actuated plunger cooperating with the teeth on the flange.

FREDERICK C. FRANK.